United States Patent
Arakawa

(10) Patent No.: US 7,218,588 B2
(45) Date of Patent: May 15, 2007

(54) DISK APPARATUS, DATA RECORDING METHOD, AND DATA REPRODUCTION METHOD FOR CONTINUOUS DATA PROCESSING

(75) Inventor: Shinichiro Arakawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 580 days.

(21) Appl. No.: 10/721,181

(22) Filed: Nov. 26, 2003

(65) Prior Publication Data

US 2004/0105361 A1    Jun. 3, 2004

(30) Foreign Application Priority Data

Nov. 29, 2002  (JP)  ............................. 2002-347504

(51) Int. Cl.
    *G11B 7/095*    (2006.01)
(52) U.S. Cl. .................................. 369/53.19; 369/44.32
(58) Field of Classification Search ............. 369/53.19, 369/44.32
    See application file for complete search history.

(56) References Cited

U.S. PATENT DOCUMENTS 6,363,039 B2 *  3/2002  Hayashi et al. .......... 369/44.32
6,714,496 B2 *  3/2004  Park et al. ............... 369/53.19
6,754,145 B1 *  6/2004  Shimamoto et al. ...... 369/44.32

FOREIGN PATENT DOCUMENTS

| JP | 60-066341 | 4/1985 |
| JP | 10-177729 | 6/1998 |
| JP | 2000-232677 | 8/2000 |

OTHER PUBLICATIONS

Japanese Office Action dated Jan. 4, 2005 for Appln. No. 2002-347504.

* cited by examiner

*Primary Examiner*—Gautam R. Patel
(74) *Attorney, Agent, or Firm*—Pillsbury Winthrop Shaw Pittman, LLP

(57) ABSTRACT

A data recording method according to one aspect of this invention comprises specifying a plurality of regions with different radial positions on a disk, and detecting the tilt amounts of the respective regions with respect to the optical axis of a light beam on the basis of a focus control signal used to just-focus the light beam on a recording surface of the disk, calculating tilt correction amounts for the respective regions in accordance with the tilt amounts of the respective regions, correcting a tilt of the optical axis with respect to a predetermined region on the basis of the tilt correction amount corresponding to the predetermined region, and recording data on the predetermined region while the tilt of the optical axis with respect to the predetermined region is corrected.

7 Claims, 3 Drawing Sheets

DISK APPARATUS, DATA RECORDING METHOD, AND DATA REPRODUCTION METHOD FOR CONTINUOUS DATA PROCESSING

CROSS-REFERENCE TO RELATED APPLICATIONS

This application is based upon and claims the benefit of priority from the prior Japanese Patent Application No. 2002-347504, filed Nov. 29, 2002, the entire contents of which are incorporated herein by reference.

BACKGROUND OF THE INVENTION

1. Field of the Invention

The present invention relates to a disk apparatus for recording/reproducing data on/from an optical disk using a light beam. The present invention also relates to a data recording method for recording data on an optical disk using a light beam. Furthermore, the present invention relates to a data reproduction method for reproducing data from an optical disk using a light beam.

2. Description of the Related Art

A high-density optical disk is achieved by an increase in line density and a reduction of the track pitch. Also, an optical system that irradiates a disk with a laser beam is required to achieve a reduced beam spot size as well as a higher density. The beam spot size is proportional to the wavelength of a light source and is inversely proportional to the numerical aperture (NA) of an objective lens. Therefore, the light source must use a shorter wavelength with increasing density.

The influences of disk tilts on recording/reproduction become more serious with increasing density of an optical disk. If a disk suffers any tilts, the signal recording characteristics lower, and crosstalk upon reproduction of a signal increases. In order to solve such problems, an optical disk apparatus which detects and compensates for any disk tilt has been proposed in Jpn. Pat. Appln. KOKAI Publication No. 2000-232677.

Such disk tilt is not uniform over the entire surface of the disk. For example, more serious disk tilt often appears toward the outer periphery of a disk. On the other hand, data recording/reproduction on/from a disk is often executed continuously over a broad range of a disk. Since such continuous recording/reproduction over a broad range of a disk is influenced by various disk tilts, appropriate recording/reproduction is often disturbed. The technique disclosed in the above reference cannot solve this problem.

BRIEF SUMMARY OF THE INVENTION

A disk apparatus according to one aspect of the present invention comprises an irradiation unit configured to irradiate a recording surface of a disk with a light beam, a reflected light detection unit configured to detect reflected light of the light beam irradiated by the irradiation unit, a focus control unit configured to control focus on the basis of a focus control signal generated from the reflected light detected by the reflected light detection unit, a tilt amount detection unit configured to specify a plurality of regions with different radial positions on the disk, and to detect tilt amounts of respective regions with respect to an optical axis of the light beam irradiated by the irradiation unit on the basis of the focus control signal, a tilt correction unit configured to calculate tilt correction values for respective regions in accordance with the tilt amounts of the respective regions detected by the tilt amount detection unit, and correct a tilt of the optical axis with respect to a predetermined region on the basis of the tilt correction value corresponding to the predetermined region, and a recording unit configured to record data on the predetermined region while the tilt of the optical axis with respect to the predetermined region is corrected by the tilt correction unit.

A data recording method according to one aspect of the present invention comprises: specifying a plurality of regions with different radial positions on a disk, and detecting tilt amounts of the respective regions with respect to an optical axis of a light beam on the basis of a focus control signal used to just-focus the light beam on a recording surface of the disk; calculating tilt correction amounts for the respective regions in accordance with the tilt amounts of the respective regions; correcting a tilt of the optical axis with respect to a predetermined region on the basis of the tilt correction amount corresponding to the predetermined region; and recording data on the predetermined region while the tilt of the optical axis with respect to the predetermined region is corrected.

A data reproduction method according to one aspect of the present invention comprises: specifying a plurality of regions with different radial positions on a disk, and detecting tilt amounts of the respective regions with respect to an optical axis of a light beam on the basis of a focus control signal used to just-focus the light beam on a recording surface of the disk; calculating tilt correction amounts for the respective regions in accordance with the tilt amounts of the respective regions; correcting a tilt of the optical axis with respect to a predetermined region on the basis of the tilt correction amount corresponding to the predetermined region; and reproducing data from the predetermined region while the tilt of the optical axis with respect to the predetermined region is corrected.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A preferred embodiment of the present invention will be described hereinafter with reference to the accompanying drawings.

Figure 1:
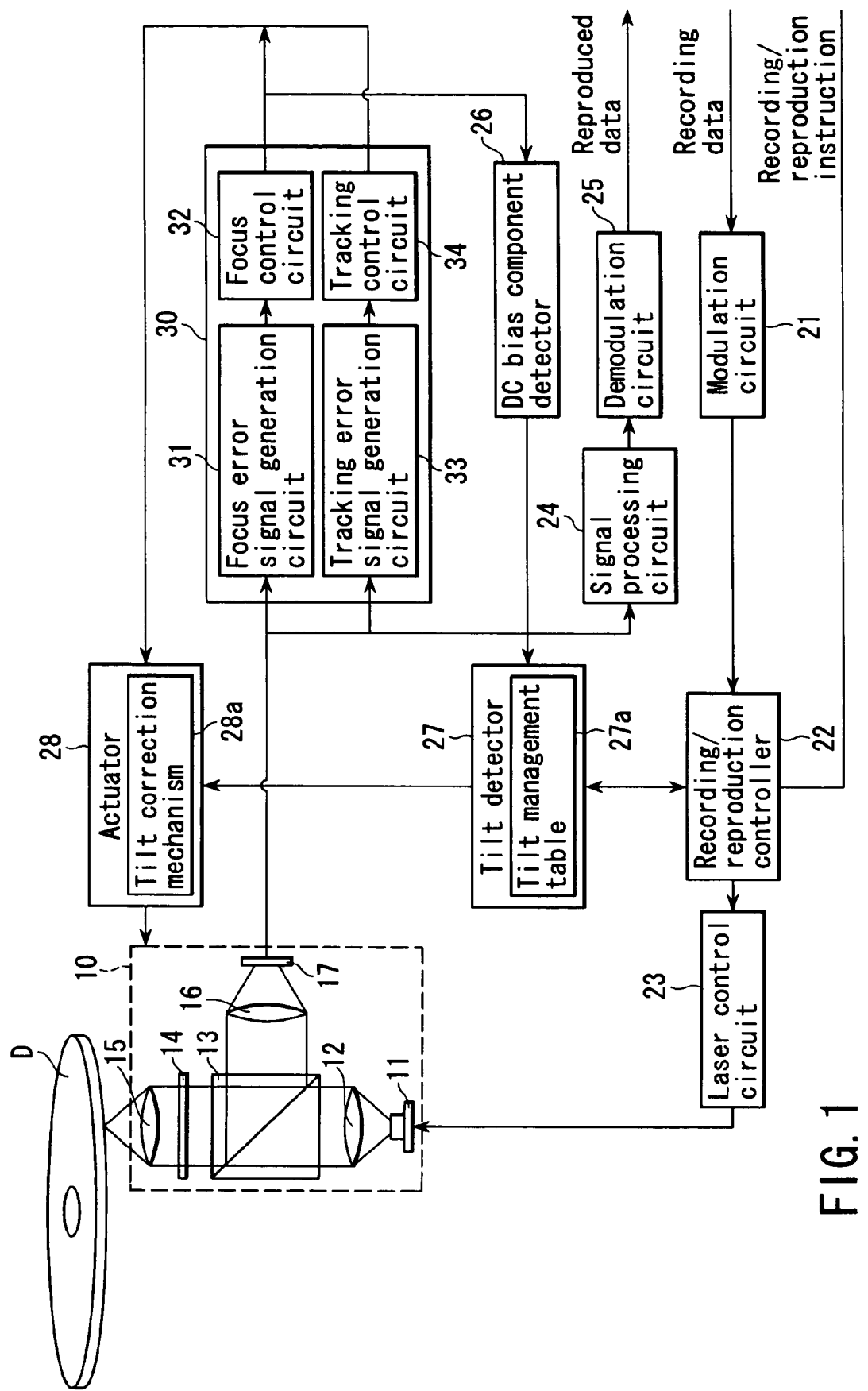
FIG. 1 is a schematic block diagram showing the arrangement of an optical disk apparatus according to an embodiment of the present invention.

FIG. 1 is a schematic block diagram showing the arrangement of an optical disk apparatus according to an embodiment of the present invention. This optical disk apparatus records information on an optical disk D such as a CD-R, CD-RW, DVD-R, DVD-RW, DVD-RAM, or the like, and reproduces data recorded on such optical disk D.

As shown in FIG. 1, the optical disk apparatus comprises an optical pickup 10, modulation circuit 21, recording/reproduction controller 22, laser control circuit 23, signal processing circuit 24, demodulation circuit 25, DC bias component detector 26, tilt detector 27, actuator 28, and focus tracking controller 30.

The optical pickup 10 comprises a laser 11, collimator lens 12, polarization beam splitter (to be referred to as a PBS hereinafter) 13, quarter wave plate 14, objective lens 15, focusing lens 16, and photodetector 17.

The focus tracking controller 30 comprises a focus error signal generation circuit 31, focus control circuit 32, tracking error signal generation circuit 33, and tracking control circuit 34.

An information recording process on the optical disk D by the optical disk apparatus will be explained below. A general recording process will be described first, and a recording process with tilt correction will then be described. The modulation circuit 21 modulates recording information (data symbol) provided from a host to a predetermined channel bit sequence in accordance with a predetermined modulation scheme. The channel bit sequence corresponding to the recording information is input to the recording/reproduction controller 22. This recording/reproduction controller 22 also receives a recording/reproduction instruction (in this case, a recording instruction) from the host. The recording/reproduction controller 22 outputs a control signal to the actuator 28, and drives the optical pickup to focus a light beam at a target recording position. Furthermore, the recording/reproduction controller 22 supplies the channel bit sequence to the laser control circuit 23. The laser control circuit 23 converts the channel bit sequence into a laser drive waveform, and drives the laser 11. That is, the laser control circuit 23 pulse-drives the laser 11. With this control, the laser 11 emits a recording light beam corresponding to a desired bit sequence. The recording light beam emitted by the laser is converted into collimated light by the collimator lens 12. The collimated light enters and is transmitted through the PBS 13. The beam transmitted through the PBS 13 passes through the quarter wave plate 14, and is focused on the information recording surface of the optical disk D. The focused beam is maintained in a state wherein it can form a best small spot on the recording surface, under the focus control of the focus control circuit 32 and actuator 28, and the tracking control of the tracking control circuit 34 and actuator 28.

Next, a data reproduction process from the optical disk D by the optical disk apparatus will be described below. A general reproduction process will be described first, and a reproduction process with tilt correction will then be described. The recording/reproduction controller 22 receives a recording/reproduction instruction (in this case, a reproduction instruction) from the host. The recording/reproduction controller 22 outputs a reproduction control signal to the laser control circuit 23 in accordance with the reproduction instruction from the host. The laser control circuit 23 drives the laser 11 on the basis of the reproduction control signal. With this drive control, the laser 11 emits a reproduction light beam. The reproduction light beam emitted by the laser is converted into collimated light by the collimator lens 12. The collimated light enters and is transmitted through the PBS 13. The light beam transmitted through the PBS 13 passes through the quarter wave plate 14, and is focused on the information recording surface of the optical disk D. The focused reproduction light beam is maintained in a state wherein it can form a best small spot on the recording surface, under the focus control of the focus control circuit 32 and actuator 28, and the tracking control of the tracking control circuit 34 and actuator 28. At this time, the reproduction light beam that strikes the optical disk D is reflected by a reflection film or reflective recording film in the information recording surface. The reflected light is transmitted through the objective lens 15 in the reverse direction, and is converted into collimated light again. The reflected light is transmitted through the quarter wave plate 14, and is reflected by the PBS 13 since it has a plane of polarization perpendicular to the incoming light. The beam reflected by the PBS 13 is converted into convergent light by the focusing lens 16, and enters the photodetector 17. The photodetector 17 comprises, e.g., a 4-split photodetector. The light beam that has entered the photodetector 17 is photoelectrically converted into an electrical signal, which is then amplified. The amplified signal is equalized and binarized by the signal processing circuit 24, and is then supplied to the demodulation circuit 25. The signal undergoes demodulation corresponding to a predetermined modulation method in the demodulation circuit 25, thus outputting reproduction data.

The focus error signal generation circuit 31 generates a focus error signal on the basis of some components of the electrical signal output from the photodetector 17. Likewise, the tracking error signal generation circuit 33 generates a tracking error signal on the basis of some components of the electrical signal output from the photodetector 17. The focus control circuit 32 controls the actuator 28 to control focusing of a beam spot on the basis of the focus error signal. The tracking control circuit 34 controls the actuator 28 to control tracking of a beam spot on the basis of the tracking error signal.

Figure 2:
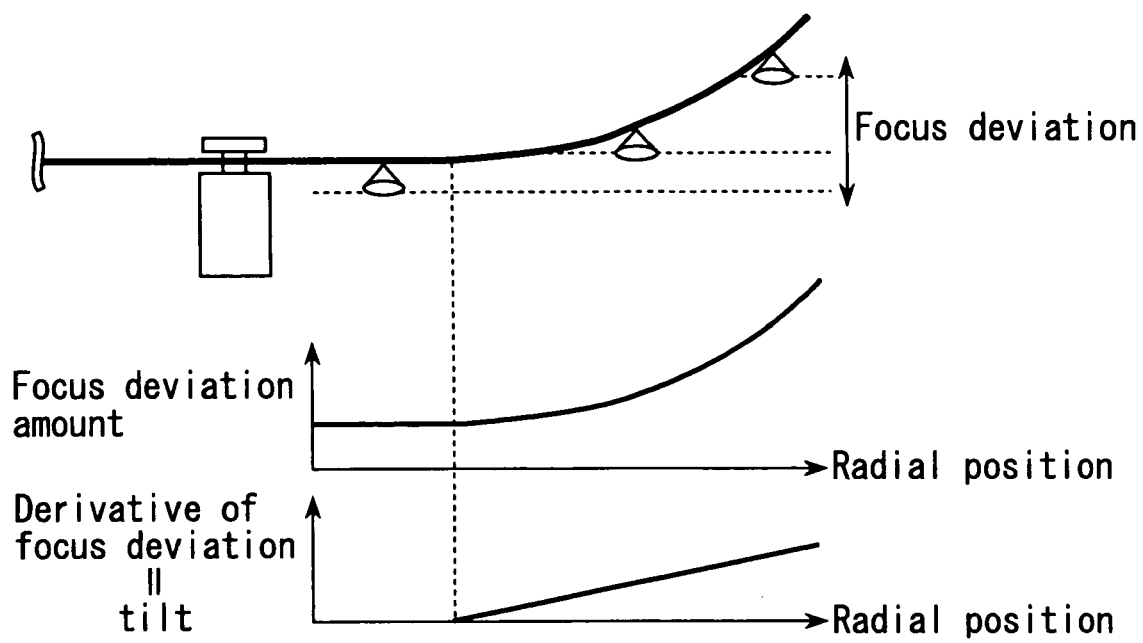
FIG. 2 is a view for explaining an example of the principle of disk tilt detection.

The principle of disk tilt detection will be described below with reference to FIG. 2. As shown in FIG. 2, if a disk is warped, the focus error signal generation circuit 31 generates a focus error signal in accordance with the degree of warp. The focus control circuit 32 generates a focus control signal on the basis of this focus error signal, and drives the actuator 28 using the focus control signal, thus just-focusing the light beam onto the recording surface of the disk. That is, a bias component is generated in the focus control signal in accordance with the degree of warp of the disk.

The middle portion of FIG. 2 shows the relationship between this bias component (focus deviation amount) and radial position, and the lower portion of FIG. 2 shows the relationship between the derivative of the focus deviation amount and the radial position. As can be seen from FIG. 2, the derivative of the focus deviation amount is proportional to the disk tilt. Therefore, by measuring the slope of this focus deviation amount, the disk tilt amount can be detected. However, in an actual system, the bias component of the focus control signal is influenced by signal noise and measurement variations. For this reason, the derivative output of a bias signal is disturbed, and the disk tilt amount may be erroneously detected.

Hence, in the optical disk apparatus of the present invention, the tilt amount of the optical axis with respect to the region between two points is detected from the difference between bias values at two points. In this way, the influences of signal noise and measurement variations contained in the bias component can be greatly relaxed, and an accurate disk tilt amount can be detected.

Upon tilt detection, the optical disk apparatus controls a light beam to trace a plurality of positions with different radial distances on the disk, and samples focus error signals from the plurality of positions. The focus error signal generation circuit 31 generates a plurality of focus control signals on the basis of the plurality of focus error signals sampled from these plurality of positions. The DC bias component detector 26 detects a plurality of DC bias components on the basis of these plurality of focus control signals. The tilt detector 27 acquires the plurality of DC bias components detected by the DC bias component detector 26, and detects the tilt amount of the optical axis with respect to a given region on the basis of the difference between two DC bias components. That is, the tilt detector 27 detects the tilt amounts of the optical axis with respect to a plurality of regions with different radial distances on the disk on the basis of the plurality of bias components sampled from the plurality of positions with different radial distances on the disk. Furthermore, the tilt detector 27 calculates tilt correction values in accordance with the tilt amounts of the respective regions, and stores the tilt correction values in a tilt management table 27a. In this manner, the tilt correction values can be obtained over the entire surface of the disk.

Upon recording data on a predetermined region in response to a recording/reproduction instruction, a tilt correction mechanism 28a is controlled on the basis of the tilt correction value for the predetermined region, which is detected by the tilt detector 27, so as to correct the angle of the objective lens 15 in correspondence with the tilt of the predetermined region. That is, the tilt of the optical axis with respect to the predetermined region is corrected. Likewise, upon reproducing data from a predetermined region, the tilt correction mechanism 28a is controlled on the basis of the tilt correction value for the predetermined region, which is detected by the tilt detector 27, so as to correct the angle of the objective lens 15 in correspondence with the tilt of the predetermined region. That is, the tilt of the optical axis with respect to the predetermined region is corrected.

Figure 3:
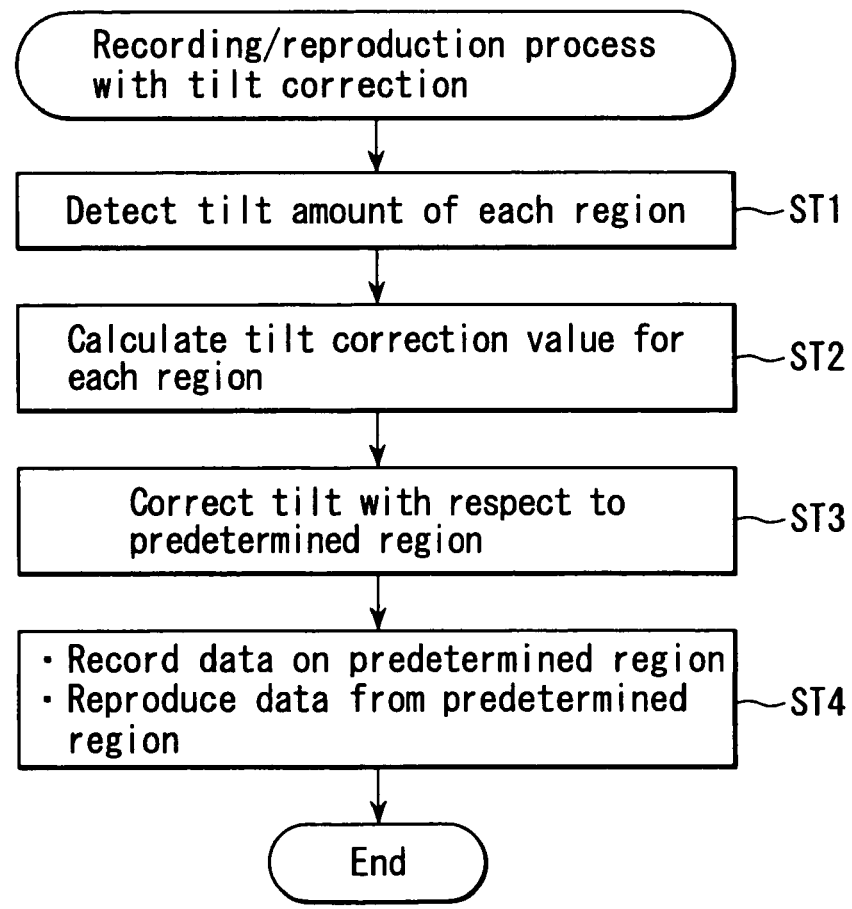
FIG. 3 is a flow chart showing an example of a recording/reproduction process with tilt correction.

The recording/reproduction process with tilt correction will be summarized below with reference to FIG. 3. As shown in FIG. 3, the tilt detector 27 detects the tilt amounts of the respective regions over the entire surface of the disk (ST1). That is, the tilt amounts of the respective regions with respect to the optical axis of a light beam are detected. Furthermore, the tilt detector 27 calculates tilt correction values for the respective regions in accordance with the tilt amounts of the respective regions (ST2), and stores them in the tilt management table 27a.

Upon recording data on a predetermined region, the tilt of the optical axis with respect to the predetermined region is corrected on the basis of the tilt correction value corresponding to that region (ST3), and data is then recorded on the predetermined region (ST4). Upon reproducing data from a predetermined region, the tilt of the optical axis with respect to the predetermined region is corrected on the basis of the tilt correction value corresponding to that region (ST3), and data is then reproduced from the predetermined region (ST4).

Figure 4:
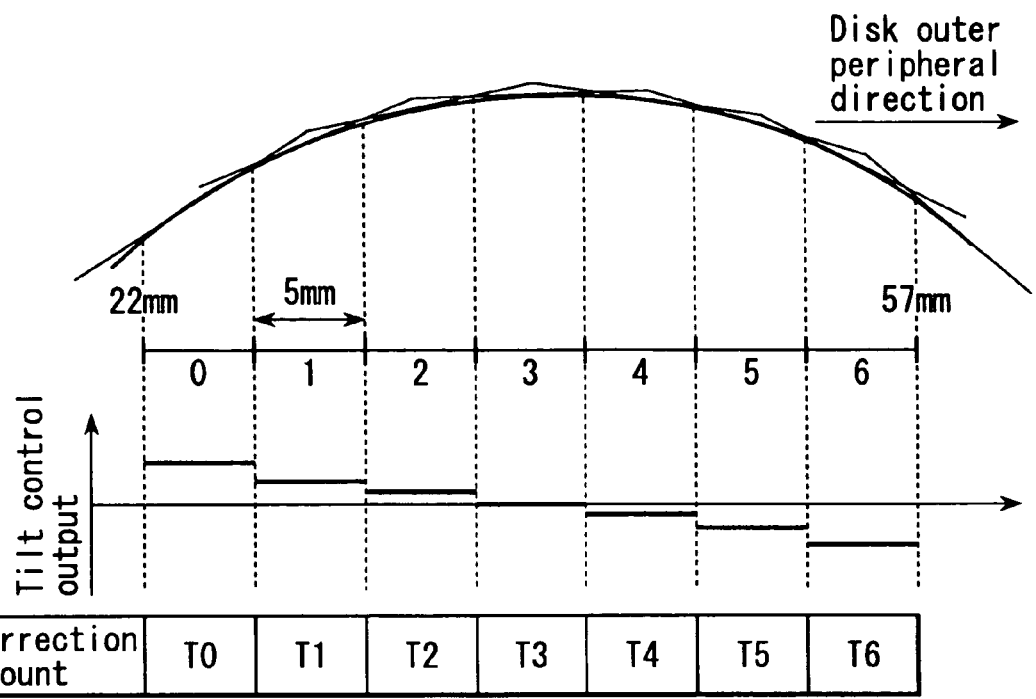
FIG. 4 shows a practical example of tilt detection.

FIG. 4 shows a practical example of tilt detection. In FIG. 4, a disk-like medium having a diameter of 120 mm is assumed. Tilts are detected for respective regions in 5-mm increments to have a disk radial position of 22 mm as the start point. As a result, tilt correction values for regions obtained by radially dividing the entire disk surface into seven can be obtained. The start point position and measurement intervals are not limited to these specific values, and arbitrary values may be similarly used. Tilt amount T0 of region 0 is calculated based on the difference between focus bias value d0i at the inner peripheral boundary position of region 0, and focus bias value d0o at the outer peripheral boundary position of region 0 using:

$$T0 = \sin^{-1} \frac{d0o - d0i}{5 \text{ mm}}$$

In this case, focus bias value d0i corresponds to that at the disk radial position of 22 mm shown in FIG. 4. On the other hand, focus bias value d0o corresponds to that at the position [disk radial position of 22 mm+5 mm] shown in FIG. 4.

Likewise, the tilt amounts can be calculated from the focus bias differences between two neighboring points of the boundaries of other regions. As a result, a tilt management table (T0 to T6) of respective regions shown in FIG. 4 is generated.

Figure 5:
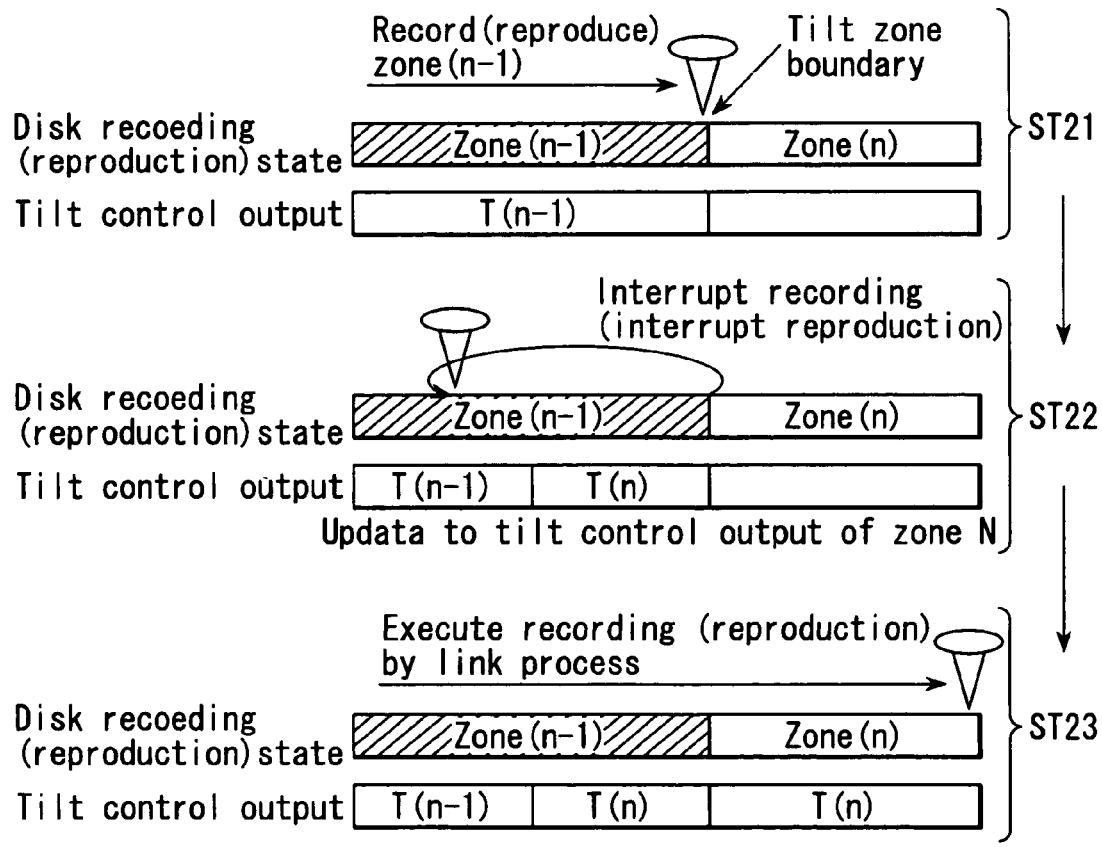
FIG. 5 is a view for explaining an example of a continuous recording process for continuously recording data on a plurality of successive regions, and a continuous reproduction process for continuously reproducing data from a plurality of successive regions.

A continuous recording process for continuously recording data on a plurality of successive regions and a continuous reproduction process for continuously reproducing data from a plurality of successive regions will be described below with reference to FIG. 5. That is, as shown in FIG. 5, processes for successive zones (n-1) and (n) will be explained. Note that "zones" may use either zones which are defined in advance on the disk, or new zones which are set for the purpose of tilt detection.

ST21 shows a state wherein data is recorded on zone (n-1) or data is reproduced from zone (n-1). The tilt correction mechanism 28a corrects the tilt of the optical axis with respect to zone (n-1) on the basis of correction value T(n-1) stored in the tilt management table 27a. After the tilt of the optical axis with respect to zone (n-1) has been corrected, data is recorded on zone (n-1) or data is reproduced from zone (n-1). That is, by tracing a light beam from the leading end to the trailing end of zone (n-1), data is recorded or reproduced.

ST22 shows a control method when the boundary between zones (n-1) and (n) is reached. For zone (n), tilt correction using correction value T(n) is required. As shown in ST22, at the boundary between zones, a recording operation is temporarily interrupted and a reproduction operation starts. Or a reproduction operation is temporarily interrupted. After that, the pickup is returned to an inner peripheral position, and the tilt of the optical axis is corrected based on correction value T(n). That is, the tracing destination of a light beam is returned to zone (n-1), and the light beam is traced from zone (n-1) toward the leading end of zone (n). At this time, the tilt of the optical axis with respect to zone (n) is corrected. Such temporary interruption of the recording or reproduction operation is required to avoid the influence of a transient response of the tilt control system on recording or reproduction quality.

ST23 shows a state wherein the tilt of the optical axis with respect to zone (n) has been corrected based on correction value T(n), and the recording or reproduction operation restarts from the recording interrupted position by a link process. That is, by tracing a light beam from the leading end to the trailing end of zone (n), data is recorded or reproduced. In this manner, data can be recorded or reproduced from the leading end of zone (n) while the tilt is appropriately corrected in accordance with that of zone (n).

By executing a series of operations mentioned above at the boundaries of respective regions on the disk, the recording/reproduction quality can be improved by the tilt control on the entire disk surface.

An example of the link process will be explained below. That is, an example of a process for recording data so that data before and after interruption can continue will be explained.

Data to be recorded is converted into ECC (Error Correction Code) blocks in accordance with a predetermined recording format. Addresses are assigned in turn to respective blocks. The blocks with the addresses are inserted between synchronization signals to generate recording data, and the generated recording data is recorded on an optical disk. That is, a synchronization signal (former half), address, data to be recorded, and synchronization signal (latter half) are repetitively recorded on the optical disk.

As shown in ST22, when the boundary between zones (n-1) and (n) is reached, data recording is interrupted. More specifically, data recording is interrupted during recording of a synchronization signal. That is, data recording is interrupted at a boundary between neighboring blocks. At this time, the address of the block before the data recording interrupted position is stored as an end address. When the tracing destination of a light beam is returned to zone (n-1), and the light beam is traced from zone (n-1) toward the leading end of zone (n), the already recorded data is read out from zone (n-1) toward the leading end of zone (n). That is, the synchronization signal, address, and data to be recorded are read out. The end of the recorded portion is searched for based on the readout address. When the readout address matches the end address, it is determined that the block including this address corresponds to the end. If the end block is found in this way, the reproduction operation is switched to the recording operation while the synchronization signal is reproduced after the end block. After switching, the recording of the recording data restarts. In this manner, data before and after interruption can be continuously recorded.

Note that land pre-pits are formed on an optical disk such as a DVD-R or the like to easily find the head of each block. The boundary between blocks may be found based on a land pre-pit to restart recording.

The functions and effects of the present invention will be summarized below.

(1) According to the present invention, since a disk tilt is detected from a focus control signal, no tilt detection sensor is required, and a cost problem of the apparatus can be suppressed.

(2) According to the present invention, since the tilt amount of the optical axis with respect to the region between two points is detected from the difference between bias values at two points, the influences of signal noise and measurement variations contained in a bias component can be greatly relaxed, and a disk tilt can be accurately detected.

(3) According to the present invention, since a data recording/reproduction process is executed over a relatively broad region after appropriate tilt correction is applied to each of regions with different tilt amounts, data can be recorded/reproduced without any drop of recording/reproduction quality.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk apparatus comprising:
an irradiation unit configured to irradiate a recording surface of a disk with a light beam;
a reflected light detection unit configured to detect reflected light of the light beam irradiated by the irradiation unit;
a focus control unit configured to control focus on the basis of a focus control signal generated from the reflected light detected by the reflected light detection unit;
a tilt amount detection unit configured to specify a plurality of regions with different radial positions on the disk, and to detect tilt amounts of respective regions with respect to an optical axis of the light beam irradiated by the irradiation unit on the basis of the focus control signal;
a tilt correction unit configured to calculate tilt correction values for respective regions in accordance with the tilt amounts of the respective regions detected by the tilt amount detection unit, and correct a tilt of the optical axis with respect to a predetermined region on the basis of the tilt correction value corresponding to the predetermined region;
a recording unit configured to record data on the predetermined region while the tilt of the optical axis with respect to the predetermined region is corrected by the tilt correction unit; and
a recording control unit configured, when data is continuously recorded on first and second, successive regions, to:
correct the tilt of the optical axis with respect to the first region based on a first tilt correction value using the tilt correction unit,
record data by tracing the light beam from the leading end to the trailing end of the first region by the first tilt correction value,
temporarily interrupt recording,
return tracing of the light beam to the first region and correct the tilt of the optical axis with respect to the first region based on a second tilt correction value using the tilt correction unit while tracing the light beam from the first region toward the leading end of the second region, and
record data by tracing the light beam from the leading end to the trailing end of the second region by the second tilt correction value.

2. An apparatus according to claim 1, further comprising a reproduction unit configured to reproduce data from the predetermined region while the tilt of the optical axis with respect to the predetermined region is corrected by the tilt correction unit; and
a reproduction control unit configured, when data is continuously reproduced from the first and second, successive regions, to:
correct the tilt of the optical axis with respect to the first region based on the first tilt correction value using the tilt correction unit,
reproduce data by tracing the light beam from the leading end to the trailing end of the first region by the first tilt correction value,
temporarily interrupt reproduction,
return tracing of the light beam to the first region and correct the tilt of the optical axis with respect to the first region based on the second tilt correction value using the tilt correction unit while tracing the light beam from the first region toward the leading end of the second region, and reproduce data by tracing the light beam from the leading end to the trailing end of the second region by the second tilt correction value.

3. An apparatus according to claim 1, wherein the tilt amount detection unit detects a tilt amount of the optical axis with respect to a region bounded by two positions with different radial distances on the disk on the basis of a difference between bias components of two focus control signals corresponding to the two positions.

4. A data recording method comprising:

specifying a plurality of regions with different radial positions on a disk, and detecting tilt amounts of the respective regions with respect to an optical axis of a light beam on the basis of a focus control signal used to just-focus the light beam on a recording surface of the disk;

calculating tilt correction amounts for the respective regions in accordance with the tilt amounts of the respective regions;

correcting a tilt of the optical axis with respect to a predetermined region on the basis of the tilt correction amount corresponding to the predetermined region; and recording data on the predetermined region while the tilt of the optical axis with respect to the predetermined region is corrected;

wherein, when data is continuously recorded on first and second, successive regions;

correcting the tilt of the optical axis with respect to the first region based on a first tilt correction value;

recording data by tracing the light beam from the leading end to the trailing end of the first region by the first tilt correction value;

temporarily interrupting recording;

returning tracing of the light beam to the first region and correcting the tilt of the optical axis with respect to the first region based on a second tilt correction value while tracing the light beam from the first region toward the leading end of the second region; and recording data by tracing the light beam from the leading end to the trailing end of the second region by the second tilt correction value.

5. A method according to claim 4, wherein the tilt amounts of the respective regions are detected using a method of detecting a tilt amount of the optical axis with respect to a region bounded by two positions with different radial distances on the disk on the basis of a difference between bias components of two focus control signals corresponding to the two positions.

6. A data reproduction method comprising:

specifying a plurality of regions with different radial positions on a disk, and detecting tilt amounts of the respective regions with respect to an optical axis of a light beam on the basis of a focus control signal used to just-focus the light beam on a recording surface of the disk;

calculating tilt correction amounts for the respective regions in accordance with the tilt amounts of the respective regions;

correcting a tilt of the optical axis with respect to a predetermined region on the basis of the tilt correction amount corresponding to the predetermined region; and reproducing data from the predetermined region while the tilt of the optical axis with respect to the predetermined region is corrected;

wherein, when data is continuously reproduced from first and second, successive regions:

correcting the tilt of the optical axis with the respect to the first region based on a first tilt correction value;

reproducing data by tracing the light beam from the leading end to the trailing end of the first region by the first tilt correction value;

temporarily interrupting reproduction;

returning tracing of the light beam to the first region and correcting the tilt of the optical axis with respect to the first region based on a second tilt correction value while tracing the light beam from the first region toward the leading end of the second region; and reproducing data by tracing the light beam from the leading end to the trailing end of the second region by the second tilt correction value.

7. A method according to claim 6, wherein the tilt amounts of the respective regions are detected using a method of detecting a tilt amount of the optical axis with respect to a region bounded by two positions with different radial distances on the disk on the basis of a difference between bias components of two focus control signals corresponding to the two positions.

* * * * *